Feb. 6, 1962    R. R. KNILL ETAL    3,019,890
PORTABLE CONVEYOR UNIT
Filed April 9, 1958    4 Sheets-Sheet 1
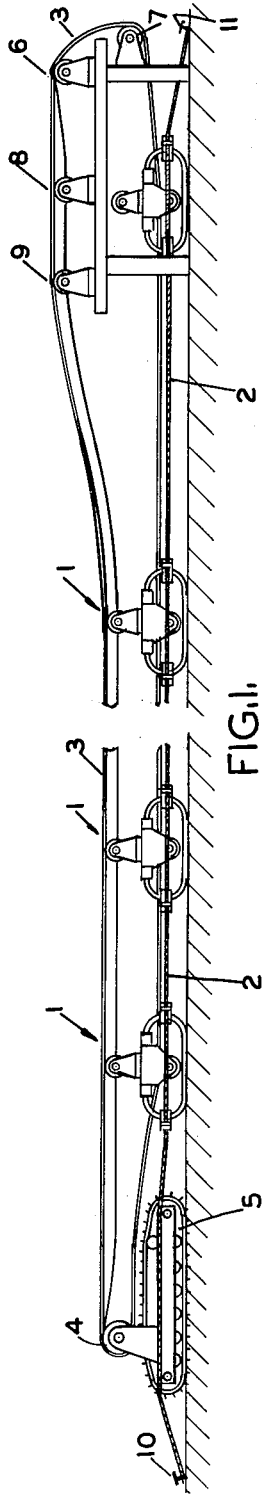
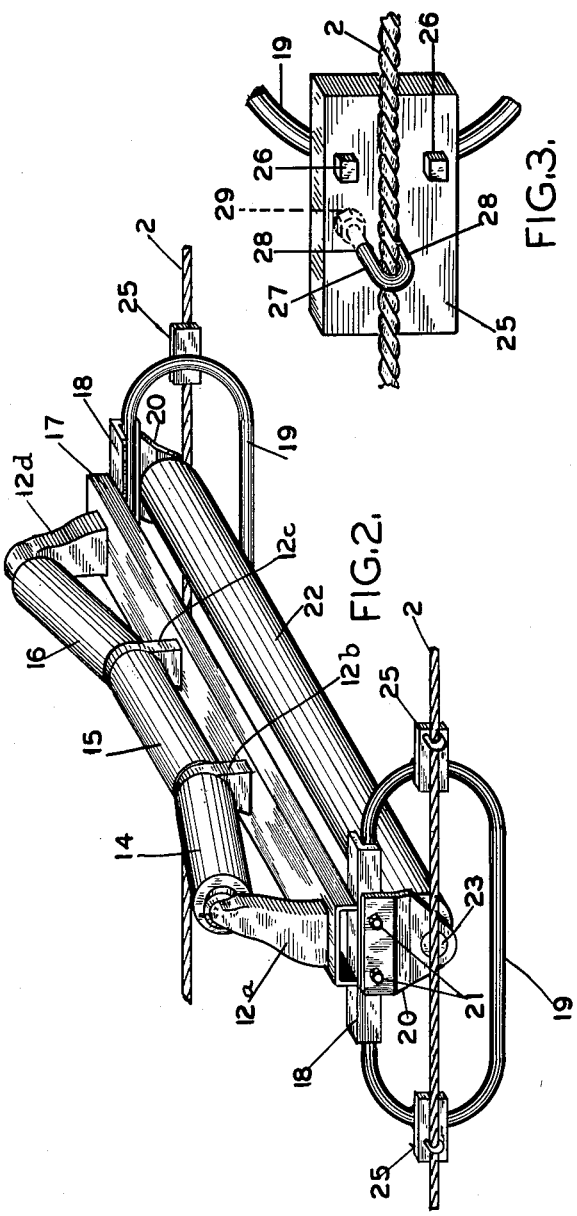
INVENTORS
RAYMOND R. KNILL
ASA LLOYD MC'LAUGHLIN
FREDERICK J. PRIESTNITZ
BY L. STEVENS, CONDER
RUSSELL G. HAWORTH
McGrew & Edwards
ATTORNEYS

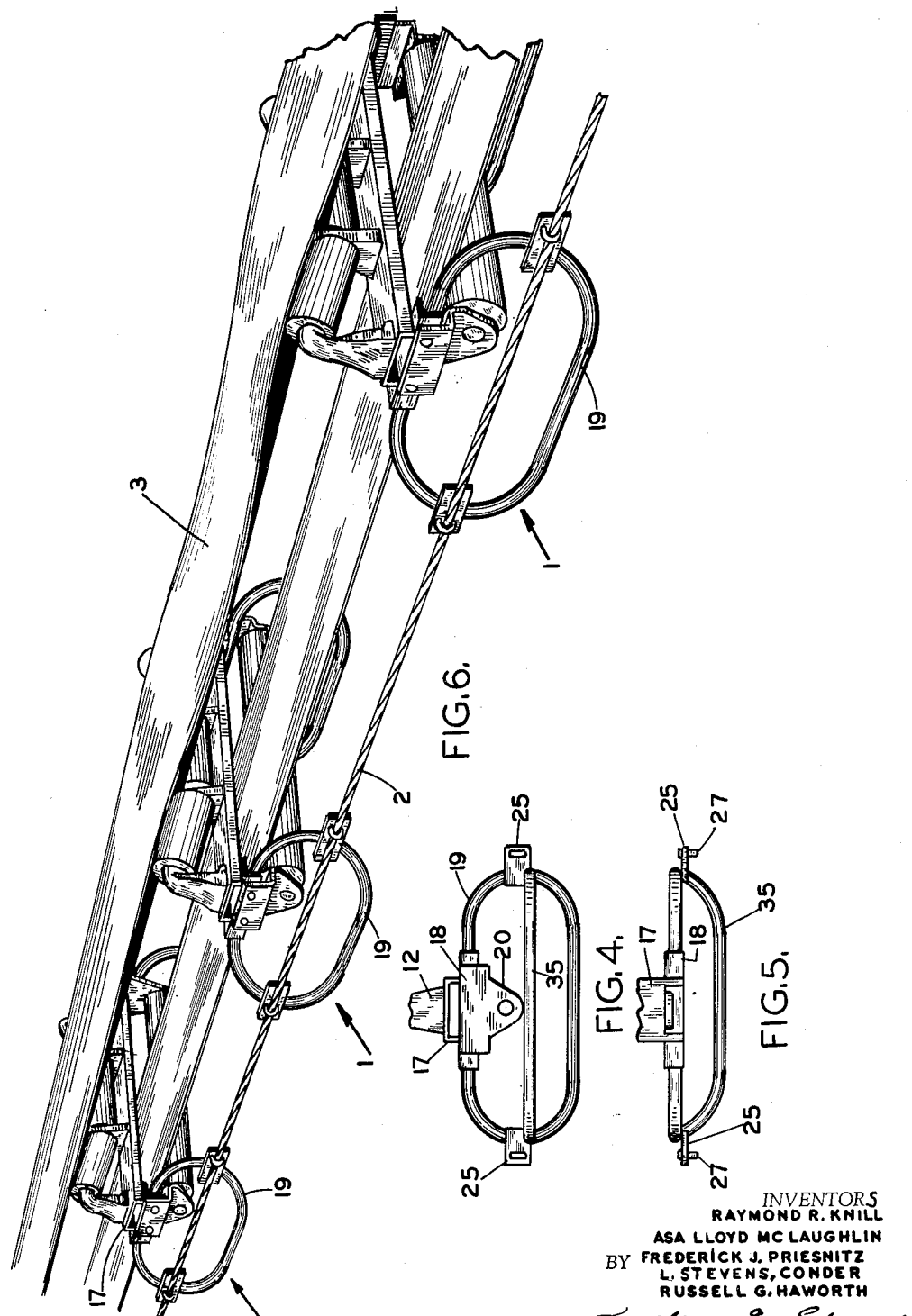

Feb. 6, 1962 R. R. KNILL ETAL 3,019,890
PORTABLE CONVEYOR UNIT
Filed April 9, 1958 4 Sheets-Sheet 3

INVENTORS
RAYMOND R. KNILL
ASA LLOYD McLAUGHLIN
FREDERICK J. PRIESNITZ
L. STEVENS CONDER
RUSSELL G. HAWORTH
BY

ATTORNEYS

United States Patent Office 3,019,890
Patented Feb. 6, 1962

3,019,890
PORTABLE CONVEYOR UNIT
Raymond R. Knill, Asa Lloyd McLaughlin, Frederick J. Priesnitz, Lory Stevens Conder, and Russell G. Haworth, Carlsbad, N. Mex., assignors to Potash Company of America, Carlsbad, N. Mex., a corporation of Colorado
Filed Apr. 9, 1958, Ser. No. 727,466
20 Claims. (Cl. 198—233)

This invention relates to new and useful improvements in endless belt conveyors, and more particularly to improvements in the belt supporting system for mobile, endless belt conveyors.

Since many mining systems, including open pit and underground, require a fairly frequent movement of the mining machines performing the digging and/or loading operations, rapid and easy movement of the conveying or hauling equipment used with such machines is of considerable advantage.

Endless belt conveyors have been used in such mining operation for many years, and many different designs have been developed including various partially-mobile types. Prior devices generally have required at least partial dismantling and subsequent rebuilding where long sections of the so-called mobile conveying systems are moved to a new operative position. Also, many prior devices require intermediate anchoring devices to maintain belt assembly support, alignment and tensioning.

The objects of the invention are to provide:

A flexible and mobile endless belt conveyor system which may be readily moved forward and backward, and around curves and corners without disassembling any of the components; that is essentially self-aligning when moved into operating position and tensioned from either terminal without intermediate anchoring devices; and which does not require intermediate anchoring devices for rope tensioning;

A flexible and mobile endless belt conveyor which may be equipped with or attached to a prime mover at one or both terminals to comprise a self-propelled conveyor system that may be moved forward and backward, around curves and corners to a new operative position without disassembly; which may be moved forward and backward over an independent vertically-arched structure to provide a free passageway for other mobile equipment, without interrupting the operation of the endless belt conveyor; and which does not require stiff or rigid members between idler positions for support, maintenance of idler position, belt tension, or for alignment of the conveyor system;

A flexible, mobile endless belt conveyor system which may be moved forward or backward and around curves and corners to a new operative position and aligned for operation by applying tension at either terminal with very little adjustment of support stand and idler, i.e., a system that is virtually self-aligning; that may be readily disconnected at an intermediate point and one end moved and a complete pre-assembled conveyor assembly section, including belting, of any predetermined length transported to and inserted in the existing conveyor system with a minimum of lost operative time; that by attachment of standard terminals and/or intermediate devices may be adapted to meet the requirements of the many mining systems; and which is sturdy and flexible to provide easy and rapid movement to a new operative position; a simple, durable and efficient endless belt conveyor which preferably has a flexible, mobile frame, which is easily and quickly movable from position to position and around curves without dismantling various components of the system, and which includes a series of self-supporting, substantially non-tipping belt support assemblies which do not require floor anchoring devices; and has a degree of self-alignment of the endless belt conveyor assembly when the conveyor is positioned for operation. This simplifies the set up procedure when positioning the conveyor in a new operating location.

The device of this invention includes a plurality of interconnected movable or skiddable stands on which troughing and return rolls or idlers may be mounted in such a position as to support the upper and lower stretches of a relatively wide, flexible, endless belt. In a preferred form, the idlers are mounted on a pair of skids which permit easy dragging movement in either forward or reverse directions, and the skids are pivotally secured to a rigid interconnection on which the required idlers are mounted and which maintains the spaced relation to a pair of horizontally parallel, flexible wire ropes interconnecting a series of such stands. The stands are spaced sufficiently far apart to support a stretch of belt including the load being carried. The conveyor may be assembled using only stands having the pivotal feature, or may be arranged with one stand having the pivotal feature, in series with a plurality of other stands not having the pivotal feature, or such stands may be located in alternate arrangement along the belt, or in any other combination.

The entire conveyor may be readily moved from position to position by merely pulling on one end to thereby drag the fully assembled conveyor. At the point of use, one end of the conveyor may be secured to an anchor and the ropes pulled taut by pulling on the other end of the conveyor and subsequently anchoring the opposite end of the conveyor to maintain the wire ropes taut. Since the connecting portions between the unanchored belt-carrying stand assemblies are flexible wire ropes, the conveyor framework readily adapts itself to rough, uneven supporting surfaces.

The device of our invention further provides a mobile framework which permits operative location of a long endless belt conveyor over uneven supporting surfaces without intermediate anchoring devices. It also permits movement of the conveyor around curves and bends without dismantling. The frame is easily and quickly dismounted for disassembling the device or adding new sections to the device, and provides a simplified operation for the use of flexible endless belt conveyors carrying ore or other material.

Other objects and advantages of the present invention may be readily ascertained by referring to the following description and appended illustrations in which:

FIGURE 1 is a side view of the belt conveyor according to the invention secured on a surface in ore conveying position;

FIGURE 2 is an oblique drawing of a belt supporting stand according to the invention, and drawn to an enlarged scale;

FIGURE 3 is an enlarged detail of a clamping system for securing belt supporting stands to interconnecting means according to the invention;

FIGURE 4 is a fragmentary side view of a modified skid according to the invention;

FIGURE 5 is a fragmentary top view of the device shown in FIGURE 4;

FIGURE 6 is a perspective view of a portion of the belt conveyor of the invention showing the position of belt-supporting stands mounted in operative belt-supporting position;

Figure 7:
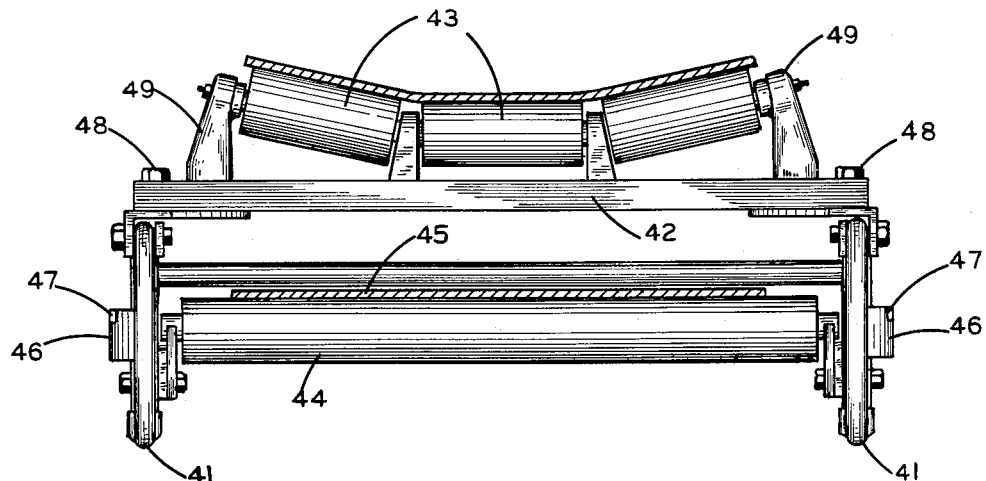
FIGURE 7 is a front view of another form of belt-supporting member.

In the device illustrated in FIGURE 1, a series of skiddable stands indicated in general by numeral 1 are interconnected to one or a plurality of wire ropes 2, and the stands 1 are spaced along the wire or cable in position to support an endless belt 3. At one end, the belt 3 passes over a large drive roller 4 which is mounted on a crawler-type prime mover, such as is currently available on the market, or other suitable driving means, and the opposite end of the belt passes over idler rolls 6 and 7 leading to a series of upper troughing rolls 8 and 9. The right end of the device as viewed in FIGURE 1 represents a loading mechanism or station which is commonly used in the art, or may be a tripper, or slinger, or other well-known mechanisms of the conveyor art. At the left end of the conveyor as viewed in FIGURE 1 the cables or ropes 2 are secured to an anchor 10, which holds the rope when the opposite end is pulled to make them taut. To hold the ropes taut, an anchor 11 is provided at the end opposite anchor 10.

Various terminal mechanisms may be utilized with the frame system of the invention, since such terminal members may be easily and simply attached to the wire ropes. As illustrated, a small crawler is secured to one end and a loader platform is secured to the opposite end. For certain operations, a crawler may be attached to each end of the belt, which provides a highly mobile device since the belt may be pulled in either direction, and because it is sturdy and flexible, it may be moved easily and rapidly to new operating positions.

Each of the belt-supporting stands 1, shown in detail in FIGURE 2, includes a series of top or troughing rollers 14, 15 and 16 mounted on shafts held in position by bearing stands 12a, 12b, 12c and 12d which are secured to cross brace or rigid interconnection 17. The cross brace or bridging member 17 is secured to an end mount 18 at each end thereof, and an endless, preferably oval, tubular skid 19 is secured to or held on each end brace 18. A pair of bracket plates 20 are secured by means of bolts 21 to the end brace 18, and the brackets support a return roller or idler 22 mounted on a shaft 23 which is mounted in the plates 20.

In the form illustrated in FIGS. 3, 4 and 5, a plate 25 is secured by means of bolts 26, rivets, welding or other suitable fastening, to each end of the oval tubular skids, and a U-bolt 27 is secured to the plate through a pair of holes 28 in position to fasten a wire rope 2. The U-bolt is pulled up tight on the wire rope 2 by means of nuts 29 so that the stand may be secured in a fixed position on the rope.

A conveyor having oval skids permits efficient movement in either direction, that is, pulling on the conveyor from either direction and permitting skidding of the stands in either direction, but any other suitable type of skid may be used. However, the skids illustrated are simple, sturdy and easily installed. The oval skids are well adapted for use in a wide base device, and, further, provide two points of attachment at opposite ends of each skid to provide longitudinal stability. Due to the elongated shape of the skids, these points are spaced sufficiently apart to provide sufficient longitudinal stability consistent with the terrain over which the conveyor is to be traversed or operated. In some cases it may be desirable to pull up slack on one rope or the other, in which case the two point connection to each skid permits loosening one connection, pulling the rope taut, and then tightening the other connection.

In preferred practice, the return idlers should be easily dismountable so that stands can be easily inserted between the upper and lower strands of the conveyor belting and the return idler remounted in its normal operating position. This makes the addition or replacement of stands to an existing conveyor system a very fast and simple operation, without uncoupling the endless conveyor belting. Also, various types of rope fasteners may be used in place of the U-bolts in the assembly. Obviously, the return roller may be a single roller, split roller, etc., and the troughing idlers may be any of the several types which are common in the belt conveyor art. The return idler may be omitted if desired.

For mine use, especially where curves and bends are very frequent, a bumper on each skid prevents damage to the stand, when the conveyor is being moved. A convenient bumper is illustrated in FIGURES 4 and 5, where an arcuate bumper 35 is secured to each plate 25 or tubular skid 19 and extends outwardly beyond the skid or the mechanisms mounted on the skids, i.e. plates, bearings, etc. An alternate form of bumper is shown as 46 in FIGS. 7, 8, 9 and 10. Either form of bumper fends off walls, protruding rocks, etc. along the course of the belt.

Figure 8:
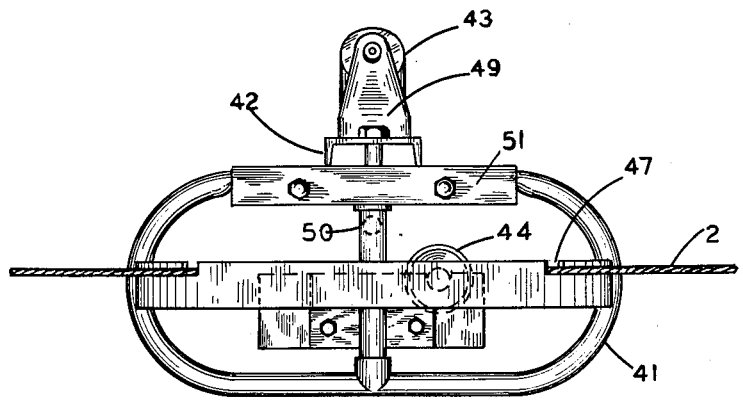
FIGURE 8 is a side view of the member shown in FIGURE 7.
Figure 9:
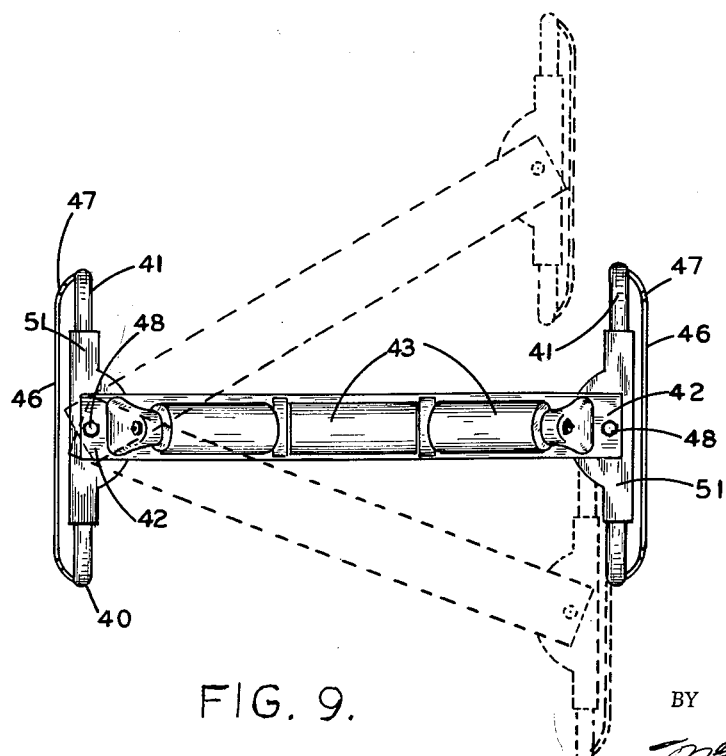
FIGURE 9 is a top view of the member shown in FIGURE 7 with pivotal movement indicated by dash line representations.

Another embodiment of the invention has been shown in FIGURES 7, 8 and 9. The conveyor support 40 of this form comprises a pair of skid members 41 spaced in lateral relation to a supported endless belt 45, and having a rigid bridging or interconnecting member 42 forming therewith an integral belt support, with upper idlers 43, and lower idlers 44 mounted on said bridging member 42 in position to support upper and lower stretches, respectively, of belt 45. Each of the skid members 41 is generally similar to the skid members 19 of FIGURE 2 and has a side bumper or guard 46 of slightly bowed shape which has slots or openings 47 in which a stretch of the flexible rope (not shown) may be fitted and fastened, as by clamping, wedging or the like.

In order to facilitate turning movement, as shown by the dashed lines in FIGURE 9, which is particularly useful when moving the conveyor about bends in transferring from one operating position to another, the bridging member is pivoted or hinged as shown at 48 in FIGURES 7, 8 and 9. This arrangement permits the conveyor assembly to be dragged or moved without particular effort at maintaining alignment during the movement, and if pull exerted on one cable of a stand assembly exceeds the pull on the opposite cable, the pivoting arrangement permits a hinging movement as indicated by the dash line representation in FIGURE 9 to adjust the stand assembly to the position required by such differential pull. A conveyor of this type is essentially self-aligning when moved into operating position and tensioned from either terminal without intermediate floor anchoring devices.

The upper troughing rollers 43 are mounted on shafts held in bearing stands 49 similar to the stands 12a, 12b, 12c and 12d, but the base portion of the stands should provide enough space at the ends of interconnecting member 42 to receive the pivots 48. The skid members 41 preferably are provided with vertical brace members 50 supporting at their top a plate 51 into which the pivot 48 extends.

Figure 10:
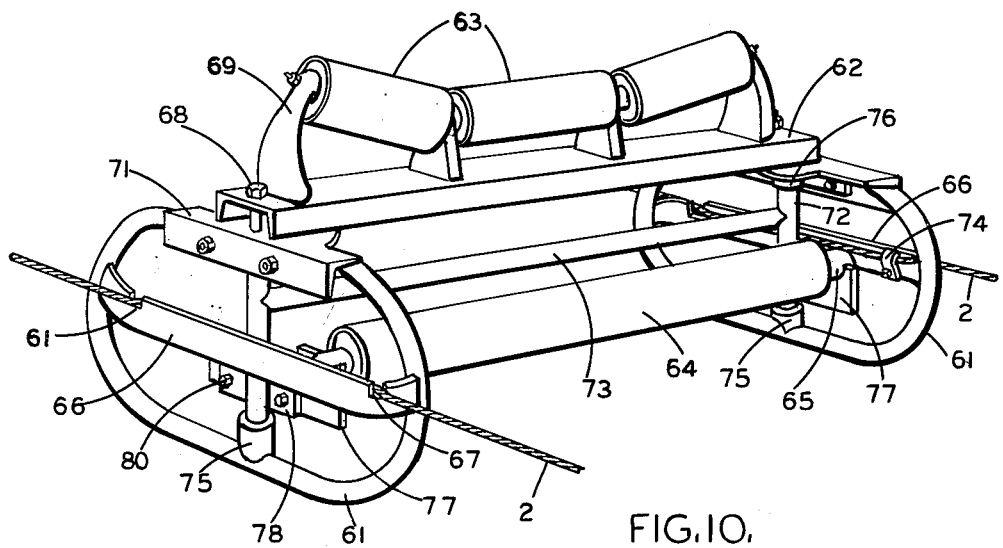
FIGURE 10 is a perspective drawing of still another form of belt-supporting member.

A preferred embodiment of the belt supporting member has been shown in FIG. 10. In this form, the skid members 61, preferably formed of tubular material in a substantially oval shape, are arranged in pairs and support at their top a beam member 62 on which the troughing rolls 63 are mounted, while a return idler 64 having a central shaft 65 is supported in a lower position on such structure. Each of the members 61 is provided with a bumper 66, generally similar to the bumper 46 of FIG. 9, including the provision of slots 67 adjacent each of its ends through which the cable 2 extends. The beam 62 is pivoted at each of its ends as shown at 68 and has upright stands 69 for support of the troughing rolls 63. The pivot 68 extends through the upper surface of a bearing plate 71 on which beam 62 is seated and thus permits a swinging movement of the support from either end relative to the conveyor belt.

Each of the skid members 61 has a vertical support member 72 interconnected by a bridging member 73. A cleat 74 on bumper 66 adjacent each of the slots 67 holds the enclosed portion of the cable against lengthwise movement relative to the support. The vertical members 72 preferably are formed of tubular material similar to skid members 61 and have their ends secured in lower sockets 75 and upper sockets 76. An inner plate 77 is provided with a suitable seat or journal for shaft 65 of idler 64 and this plate is connected with an outer plate 78 by bolts 80 or other suitable fastenings. The outer plate 78 is secured on the vertical member 72 by welding or in any other suitable manner. Such a mounting arrangement of rolls or idlers make possible the use of many of the various types of troughing and return idler assemblies currently manufactured.

In preferred practice, involving the use of a digging machine and its ore pickup, such a conveyor may be assembled with the stands, as shown in FIGURES 2, 7 and 10, spaced apart to carry the belting and the material to be conveyed. As the mining operation proceeds, additional complete conveyor sections of predetermined may be transported to and inserted in the existing conveyor installation to lengthen it with a minimum loss of operating time. Conversely when the mining operation is on the retreat a complete section of conveyor may be removed from between the terminals and the conveyor installation shortened by that length without changing other components of the conveyor.

The conveyor may be assembled in several segments consisting of a plurality of stands connected with proper lengths of wire rope fitted on the ends with snap rings or the like to facilitate easy attachment of several segments to form a longer conveyor; obviously, chain or other flexible connector may be substituted for the wire rope connection.

When several of these stands are connected together by two cables, they can be pulled up and over a bridge arrangement constructed somewhat like a conventional steel railroad bridge but having channel irons with the channels open at the top and extending longitudinally along the top of the bridge. One of the skidding members rides in each channel and the conveyor extends for some distance on either side of the bridging member. Another conveyor may be run at right angles under the bridge or other kinds of traffic may run under the bridge. The conveyor may be pulled back and forth across the top of the bridge without disturbing the flow of traffic under the bridge.

While the invention has been described by reference to specific devices, there is no intent to limit the spirit or scope of the invention to the precise details so set forth, except as defined in the following claims.

We claim:

1. In a belt conveyor, the combination of a belt-supporting assembly, including elongated members constructed for skidding movement and arranged in coacting pairs in laterally spaced substantially parallel relation to said belt, a bridging member pivotally interconnected to each of at least one pair of skiddable members, upper and lower belt-supporting idlers disposed on said assembly, flexible means extending along a side of and detachably interconnecting the respective belt support assemblies arranged in series, each of said flexible means being interconnected with at least two spaced points on each skiddable member, one substantially forwardly and one substantially rearwardly of the center of said skiddable member so as to provide longitudinal stability when pull is exerted on said flexible means.

2. In a belt conveyor, the combination of a belt-supporting assembly, including a series of members constructed for skidding movement and arranged in coacting pairs in laterally spaced substantially parallel relation to said belt, a bridging member pivotally interconnected to each of each pair of skiddable members, upper and lower belt-supporting idlers disposed on said assembly, a flexible cable extending along each side of and detachably interconnecting the respective belt support assemblies, each said flexible cable being interconnected with two or more points on each skiddable member, at least one such point being substantially forwardly and at least one substantially rearwardly of the center of said skiddable member so as to provide longitudinal stability when pull is exerted on said flexible cables.

3. In a belt conveyor, the combination of a belt-supporting assembly, including members constructed for skidding movement and arranged in coacting pairs in laterally spaced substantially parallel relation to said belt, a bridging member pivotally interconnected to each of each pair of skiddable members, upper and lower belt-supporting idlers disposed on said assembly, flexible cables extending along and adjacent each side of the belt and interconnecting the respective supports, each said cable being connected at two or more points on each skiddable member at least one being substantially forwardly and at least one substantially rearwardly of the center of said skiddable member and spaced sufficiently apart to provide longitudinally stability when pull is exerted on said cables.

4. In a belt conveyor, the combination of a belt-supporting assembly, including elongated members constructed for skidding movement and arranged in coacting pairs in laterally spaced substantially parallel relation to said belt, a bridging member pivotally interconnected to each of at least one pair of skiddable members, upper and lower belt-supporting idlers disposed on said assembly, flexible cables extending along each side of and detachably interconnecting the respective belt support assemblies arranged in series, each of said flexible cables being interconnected with at least two or more spaced points on each skiddable member with one point substantially forwardly and at least one point substantially rearwardly of the center of said skiddable member, and said points being sufficiently spaced to provide longitudinal stability for the belt.

5. A belt support assembly for endless conveyor belts comprising two substantially parallel oval members of substantial length arranged for skidding movement, a bridging member pivotally connected to each of the skiddable members intermediate their ends, and upper and lower idlers carried on said bridging member and forming a unitary assembly.

6. A belt support assembly for endless conveyor belts comprising a pair of vertically-disposed substantially parallel elongated members arranged for skidding movement, a bridging member pivotally connected to each of such members, intermediate their ends, and upper and lower idlers carried on said bridging member.

7. A belt supporting assembly for endless conveyor belts comprising two tubular members having elongated substantially parallel portions arranged for skidding movement, a bridging member pivotally interconnected to each of such members intermediate their ends, and upper and lower idlers carried on said bridging member.

8. A supporting assembly for endless conveyor belts comprising two substantially parallel elongated members constructed and arranged for skidding movement, and a bridging member pivotally interconnected to each of such skiddable members intermediate their ends, including supporting means for upper and lower idlers disposed on said bridging member.

9. In an endless belt conveyor, the combination of a series of elongated members constructed for skidding movement and arranged in coacting pairs, a rigid bridging member interconnecting the skidding members of each pair intermediate their ends so as to form a belt support, upper and lower idlers carried by said bridging member in vertically spaced relation, at least one flexible cable extending along a substantial length of the belt and being the sole interconnection between the respective supports of the series and being connected thereto at points substantially forward and rearward of the associated bridging member, and at least one prime mover arranged to impart movement to said belt, and to draw the cable taut.

10. An endless belt conveyor according to claim 9, in which the members of each pair are constructed for skidding movement in forward and rearward directions.

11. In an endless belt conveyor, the combination of a series of elongated members constructed for skidding movement and arranged in pairs, a bridging member interconnecting the skidding members of each pair intermediate their ends and forming a unitary belt support, upper and lower idlers carried on said support in substantially parallel spaced relation to said bridging member, and flexible cable means extending along the length of the belt and being the sole interconnection between the respective supports in series adjacent each end thereof and arranged to be drawn taut between the adjoining supports of the series, whereby pull exerted on an end of said cable will provide a tracking movement of said supports during skidding movement.

12. In a belt support assembly for endless conveyor belts, two elongated members constructed and arranged for skidding movement, a bridging member pivotally interconnected to each of the skiddable members intermediate their ends, and a bumper mounted at a side of said assembly on each of said members having means adjacent the ends of the elongated members for its connection to a flexible cable, and said cable being the sole interconnection between adjacent skidding members on the same side of said endless conveyor belts.

13. In a belt support assembly for endless conveyor belts, two elongated members constructed and arranged for skidding movement, a bridging member pivotally interconnected to each of the skiddable members intermediate their ends, a bumper mounted at a side of said assembly on each of said members and having at least one cable-receiving slot adjacent an end of the elongated member, and clamping means on the bumper for securing a cable extending through said slot, and said cable being the sole interconnection between adjacent skidding members on the same side of said endless conveyor belts.

14. In a belt support assembly for endless conveyor belts, two elongated members constructed and arranged for skidding movement, a bridging member pivotally interconnected to each of the skiddable members intermediate their ends, a bumper mounted at a side of said assembly on each of said members and having two longitudinally spaced slots adjacent the respective ends of the elongated members, and clamping means on the bumper for securing a cable extending through said slots adjacent each said slot, and said cable being the sole interconnection between adjacent skidding members on the same side of said endless conveyor belts.

15. In a belt conveyor, the combination of a belt-supporting assembly, including elongated members constructed for skidding movement and arranged in coacting pairs in laterally spaced substantially parallel relation to said belt, a bridging member interconnecting at least one pair of skiddable members, upper and lower belt-supporting idlers disposed on said bridging member, and flexible means extending along a side of the respective belt-supporting assemblies arranged in series, each of said flexible means being interconnected with at least two substantially spaced points on each skiddable member so as to provide longitudinal stability when pull is exerted on said flexible means, and said skidding members being the sole vertical support for the conveyor belt.

16. In a belt conveyor, the combination of a belt-supporting assembly, including elongated members constructed for skidding movement and arranged in coacting pairs in laterally spaced substantially parallel relation to said belt, a bridging member interconnecting at least one pair of skiddable members, upper and lower belt-supporting idlers disposed on said bridging members, flexible means extending along a side of the respective belt-supporting assemblies arranged in series, each of said flexible means being interconnected with at least two substantially spaced points on each skiddable member, and clamping means for interconnecting said members at said points, and said skidding members being the sole vertical support for the conveyor belt.

17. In a belt conveyor, the combination of a belt-supporting assembly, including elongated members constructed for skidding movement and arranged in coacting pairs in laterally spaced substantially parallel relation to said belt, a bridging member interconnecting at least one pair of skiddable members, upper and lower belt-supporting idlers disposed on said bridging members, flexible means extending along a side of the respective belt-supporting assemblies arranged in series, and means at each end of the skiddable members for securing said members on said flexible means, and said skidding members being the sole vertical support for the conveyor belt.

18. In a belt conveyor, the combination of a belt-supporting assembly, including elongated members constructed for skidding movement and arranged in coacting pairs in laterally spaced substantially parallel relation to said belt, a bridging member pivotally interconnecting at least one pair of skiddable members, upper and lower belt-supporting idlers disposed on said bridging member, flexible means extending along a side of the respective belt-supporting assemblies arranged in series, and means at each end of the skiddable members for securing said members on said flexible means, and said skidding members being the sole vertical support for the conveyor belt.

19. In an endless belt conveyor, the combination of a series of members constructed for skidding movement and arranged in coacting pairs, a rigid bridging member interconnecting the skidding members of each pair intermediate their ends so as to form a support for upper and lower idlers carrying said belt, said upper and lower idlers being parallel to and spaced from said bridging member, the interconnection between said bridging member and each of the coacting pair of skidding members being pivotal whereby to maintain said skidding members in a substantially parallel relationship to the belt conveyor at all times, at least one flexible cable extending along a substantial length of the belt and attached to each of the skidding members along such length at points substantially forward and rearward of associated bridging members, said cable being the sole interconnection between such members of the series, said skidding members being the sole vertical support for the conveyor.

20. As a new article of manufacture, a supporting structure for a stretch of an endless belt, comprising a pair of elongated members constructed for skidding movement and spaced in substantially parallel lateral relation to a supported endless belt, a member interconnecting said elongated skid members intermediate their ends to form a unitary belt support, upper and lower idlers mounted on said support and parallel thereto in substantially spaced relation and positioned to support upper and lower stretches of the endless belt, a bumper mounted on the side of each of said elongated members and arranged to space said structure and carried belt from obstacles at each side of the belt, and means on said support adjacent each end thereof arranged for securing the same to a flexible wire belt.

References Cited in the file of this patent

UNITED STATES PATENTS

| | | |
|---|---|---|
| 1,748,301 | McKinley | Feb. 25, 1930 |
| 2,514,715 | Milik | July 11, 1950 |
| 2,781,893 | Milik | Feb. 19, 1957 |